United States Patent
Taneyhill et al.

(10) Patent No.: US 9,434,366 B1
(45) Date of Patent: Sep. 6, 2016

(54) PARKING APPARATUS FOR A HEAVY VEHICLE DURING A LOSS OF ELECTRICAL POWER

(71) Applicant: Bendix Commercial Vehicle Systems LLC, Elyria, OH (US)

(72) Inventors: David J Taneyhill, Elyria, OH (US); Travis G Ramler, Irvine, CA (US); John J Kemer, Avon Lake, OH (US); Phillip J Kasper, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 14/682,144

(22) Filed: Apr. 9, 2015

(51) Int. Cl.
| | |
|---|---|
| *B60T 11/28* | (2006.01) |
| *B60T 11/10* | (2006.01) |
| *B60T 1/00* | (2006.01) |
| B60T 13/26 | (2006.01) |
| B60T 13/38 | (2006.01) |

(52) U.S. Cl.
CPC .............. *B60T 11/103* (2013.01); *B60T 1/005* (2013.01); *B60T 11/28* (2013.01); *B60T 13/261* (2013.01); *B60T 13/263* (2013.01); *B60T 13/385* (2013.01)

(58) Field of Classification Search
CPC .... B60T 13/261; B60T 13/263; B60T 13/38; B60T 13/385; B60T 2270/82; B60T 2270/404; B60T 2270/414; B60T 11/28; B60T 11/103; B60T 11/108
USPC ....................................................... 303/3, 89
See application file for complete search history.

(56) References Cited

U.S. PATENT DOCUMENTS

| | | | | |
|---|---|---|---|---|
| 5,061,015 A * | 10/1991 | Cramer | ................. | B60T 13/263 303/15 |
| 5,747,886 A * | 5/1998 | Parr | .................... | B60R 25/1001 180/287 |
| 6,450,587 B1* | 9/2002 | MacGregor | ............... | B60T 7/10 303/89 |
| 7,517,026 B1* | 4/2009 | Herbst | ...................... | B60T 7/20 303/113.4 |
| 8,794,718 B2 | 8/2014 | Bensch | | |

(Continued)

FOREIGN PATENT DOCUMENTS

| | | | | |
|---|---|---|---|---|
| EP | 2939891 A2 * | 1/2015 | ............. | B60T 13/66 |
| GB | 2196075 A * | 4/1988 | ............. | B60T 13/22 |

OTHER PUBLICATIONS

Bendix Commercial Vehicle Systems LLC, SD-03-10433, "Bendix FCS-9700 Fan Clutch Solenoid," Service Data Sheet, Sep. 2012, United States.

*Primary Examiner* — Thomas J Williams
(74) *Attorney, Agent, or Firm* — Cheryl L. Greenly; Brian E. Kandas; Eugene E. Clair

(57) ABSTRACT

A parking apparatus is provided for a vehicle. The apparatus comprises an electronic parking brake (EPB) valve having an air outlet port. The apparatus also comprises a pneumatic delivery line interconnecting the air outlet port of the EPB valve and a spring brake system to allow air pressure from the EPB valve to be applied to the spring brake system to maintain parking brakes of the vehicle in released position. The apparatus further comprises a normally-open solenoid valve having an air inlet port which is in communication with the delivery line which interconnects the air outlet port of the EPB valve and the spring brake system, wherein the solenoid valve is operable to vent air pressure from the delivery line and thereby to apply the spring brake system to park the vehicle in response to loss of electrical power to the solenoid valve.

18 Claims, 2 Drawing Sheets

(56) References Cited

U.S. PATENT DOCUMENTS 8,820,856 B2 9/2014 Rogers
8,944,525 B2 * 2/2015 Mederer ............... B60T 13/683
 303/123

2004/0124697 A1 7/2004 MacGregor
2010/0194185 A1 8/2010 Holzmacher
2013/0069423 A1 * 3/2013 Rowan ................... B60T 13/22
 303/2

* cited by examiner

PARKING APPARATUS FOR A HEAVY VEHICLE DURING A LOSS OF ELECTRICAL POWER

BACKGROUND

The present application relates to heavy vehicle parking systems, and is particularly directed to a parking apparatus for a heavy vehicle, such as a truck or tractor-trailer, during a loss of electrical power.

Vehicle parking systems for trucks are known. One type of vehicle parking system for trucks is an electronic parking brake (EPB) system. A typical EPB system includes an EPB valve which operates to maintain air brake system pressure and thereby to maintain parking brakes in released position. When a loss of electrical power occurs in known EPB systems when the vehicle is unparked, the parking brakes are maintained in the released position until the system pressure drops below a pop pressure associated with the EPB valve. The system pressure drops below the pop pressure in response to the truck driver pumping a foot valve to "fan down" the system pressure or other loss of system pressure. When the system pressure drops below the pop pressure associated with the EPB valve, the parking brakes are applied to park the truck in a manner as is known. It would be desirable to provide an EPB system in which the parking brakes are applied to park the truck upon a loss of electrical power without having the truck driver to pump the foot valve to fan down the system pressure below the pop pressure.

SUMMARY

In accordance with one embodiment, a parking apparatus is provided for a vehicle. The parking apparatus comprises an electronic parking brake (EPB) valve having a first air outlet port. The parking apparatus also comprises a first pneumatic delivery line interconnecting the first air outlet port of the EPB valve and a first spring brake system to allow air pressure from the EPB valve to be applied to the first spring brake system to maintain first parking brakes of the vehicle in released position. The parking apparatus further comprises a first normally-open solenoid valve having a first air inlet port which is in communication with the first delivery line which interconnects the first air outlet port of the EPB valve and the first spring brake system, wherein the first solenoid valve is operable to vent air pressure from the first delivery line and thereby to apply the first spring brake system to park the vehicle in response to loss of electrical power to the first solenoid valve.

In accordance with another embodiment, a parking brake valve is provided for a vehicle. The parking apparatus comprises a valve body having (i) a first port connected in fluid communication with air inlet ports of spring brake chambers to supply air pressure to the air inlet ports to allow air pressure to be applied to a number of spring brake chambers to maintain parking brakes of the vehicle in released position, and (ii) a second port connected in fluid communication with the air inlet ports of the spring brake chambers to vent air pressure from the air inlet ports to allow air pressure from the spring brake chambers to exhaust down and thereby to apply parking brakes of the vehicle to park the vehicle in response to an electrical signal indicative of loss of electrical power.

In accordance with yet another embodiment, a parking brake apparatus is provided for a vehicle. The parking apparatus comprises an electronic parking brake (EPB) valve having (i) a first air outlet port in fluid communication with a number of air inlet ports of a number of associated tractor spring brake chambers, and (ii) a second air outlet port in fluid communication with a number of air inlet ports of a number of associated trailer spring brake chambers. The parking apparatus further comprises electro-pneumatic means for, without vehicle driver intervention, venting air pressure from at least one of the first and second air outlet ports of the EPB valve to apply either tractor parking brakes associated with the tractor spring brake chambers or trailer parking brakes associated with the trailer spring brake chambers, or both.

DETAILED DESCRIPTION

Figure 1:
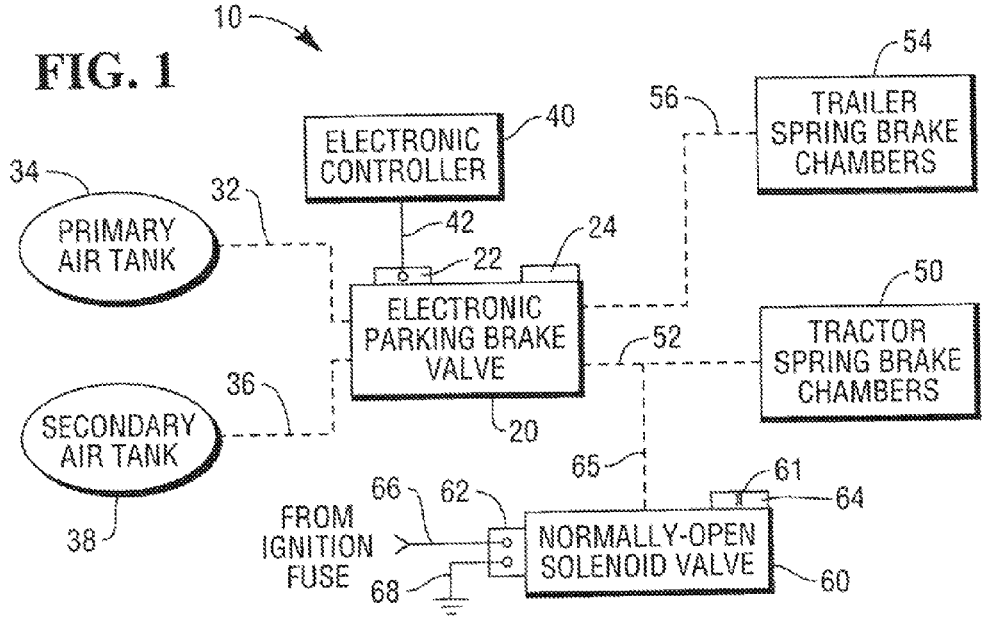
FIG. 1 is a schematic block diagram showing a parking apparatus constructed in accordance with an embodiment.

Referring to FIG. 1, parking apparatus 10 is provided for use in a heavy vehicle such as a tractor-trailer.

Parking apparatus 10 is constructed in accordance with one embodiment. In FIG. 1, electrical line connections are shown as solid lines, and pneumatic lines connections are shown as dashed lines.

Parking apparatus 10 includes an electronic parking brake (EPB) valve 20 which has electrical connector 22 and vent port 24. EPB valve 20 is connected in fluid communication through line 32 to primary air tank 34 and through line 36 to secondary air tank 38. EPB valve 20 may comprise any pneumatic or electropneumatic valve which can be used in a parking system of a heavy vehicle.

Parking apparatus 10 further includes electronic controller 40. Electronic controller 40 monitors various input signals (not shown) and provides electrical control output signal on line 42 to control operation of parking brakes of the vehicle. More specifically, electronic controller 40 provides control signal on line 42 through electrical connector 22 to control operation of EPB valve 20.

Primary air tank 34 or secondary air tank 38 provides compressed air through EPB valve 20 to tractor delivery line 52 to a number of tractor spring brake chambers 50 and to trailer delivery line 56 to a number of trailer spring brake chambers 54, comprising a spring brake system. EPB valve 20 is controlled by electronic controller 40 to vary pneumatic pressure in line 52 to tractor spring brake chambers 50 and to vary pneumatic pressure in line 56 to trailer spring chambers 54. Primary air tank 34 and secondary air tank 38 are connected in fluid communication through EPB valve 20 to delivery line 52 and to delivery line 56. Structure and operation of primary and secondary air tanks 34, 38 as compressed air supplies are known and, therefore, will not be described.

When the vehicle driver is normally driving down the road, air pressure at an air outlet port of EPB valve 20 is applied through line 52 to air inlet ports of tractor spring brake chambers 50 to maintain parking brakes of the tractor of the vehicle in released position. In addition, air pressure at an air outlet port of EPB valve 20 is applied through line 56 to air inlet ports of trailer spring brake chambers 54 to maintain parking brakes of the trailer in released position.

Figure 2:
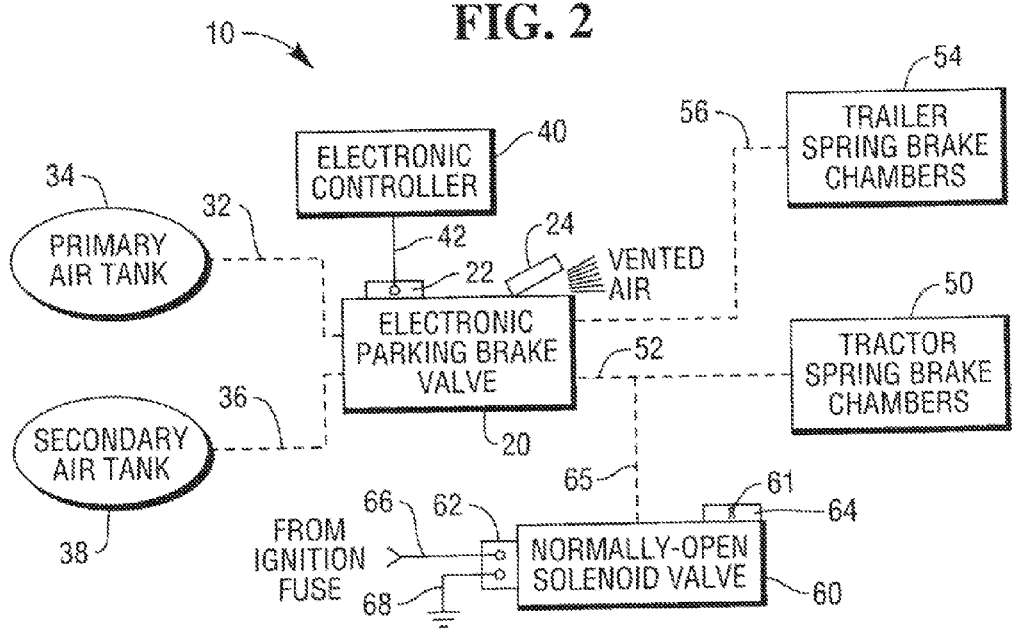
FIGS. 2 and 3 are schematic block diagrams similar to FIG. 1 and showing parts in different positions.

When the vehicle driver desires to apply parking brakes of the vehicle, the driver operates a parking switch (not shown). Electronic controller 40 provides control signal on line 42 in response the driver's intent to apply parking brakes of the vehicle. Control signal on line 42 is applied to electrical connector 22 of EPB valve 20 to unblock fluid communication between delivery line 52 and vent port 24 and to unblock fluid communication between delivery line 56 and vent port 24 so as to exhaust air through vent port 24 as shown in FIG. 2 and thereby to exhaust air from tractor spring brake chambers 50 and trailer spring brake chambers 54.

When air in spring brake chambers 50 and air in trailer spring brake chambers 54 are exhausted and system air pressure drops to a pressure less than about 45 psi to 60 psi (i.e., to a "trip pressure" set in EPB valve 20), the trailer parking brakes are applied and air continues to vent through vent port 24 until the tractor parking brakes are applied, as is known. Additional known pneumatic and/or electropneumatic valves may also be implemented in the parking apparatus 10 to apply and release the parking brakes. Structure and operation of electronic controller 40 and EPB valve 20 for controlling operation of tractor spring brake chambers 50 and trailer spring brake chambers 54 to park the vehicle are conventional and, therefore, will not be further described.

Parking apparatus 10 further includes normally-open solenoid valve 60 which has electrical connector 62 and vent port 64 with orifice 61 as schematically shown in FIG. 1. Solenoid valve 60 is a relatively small, low current, low flow valve as compared to EPB valve 20. Solenoid valve 60 includes an electrical solenoid portion and a pneumatic valve portion. Valve portion of solenoid valve 60 has an inlet port which is connected in fluid communication through line 65 and into delivery line 52 which interconnects the air outlet port of EPB valve 20 and the air inlet ports of spring brake chambers 50. Vent port 64 of solenoid valve 60 and vent port 24 of EPB valve 20 may not be in fluid communication with each other. Also, electrical connector 62 of solenoid valve 60 and electrical connector 22 of EPB valve 20 may be electrically isolated from each other. Both vent ports 24, 64 may communicate with atmosphere.

Electrical signal on line 66 is connected to electrical connector 62 to one side of an electrical coil (not shown) of solenoid portion of solenoid valve 60. The other side of electrical coil is connected through line 68 to electrical ground. Electrical signal on line 66 is from a source indicative of electrical power applied to the vehicle. For example as shown in FIG. 1, electrical power on line 66 may be from a fuse in the vehicle ignition system. Electrical coil of solenoid valve 60 may be sized to pull, for example, only 0.1 amperes of current when the vehicle ignition is ON and no current when the vehicle ignition is OFF. Alternatively, power line 66 may be connected to the same line that powers electronic controller 40.

When electrical power from ignition fuse is present on line 66 to electrical connector 62, electrical coil of solenoid portion of solenoid valve 60 is energized. When electrical coil is energized as shown in FIG. 1, valve portion of solenoid valve 60 is in closed position such that fluid communication between line 65 and vent port 64 is blocked to prevent air pressure in line 65 from being vented through orifice 61 of vent port 64.

Figure 3:
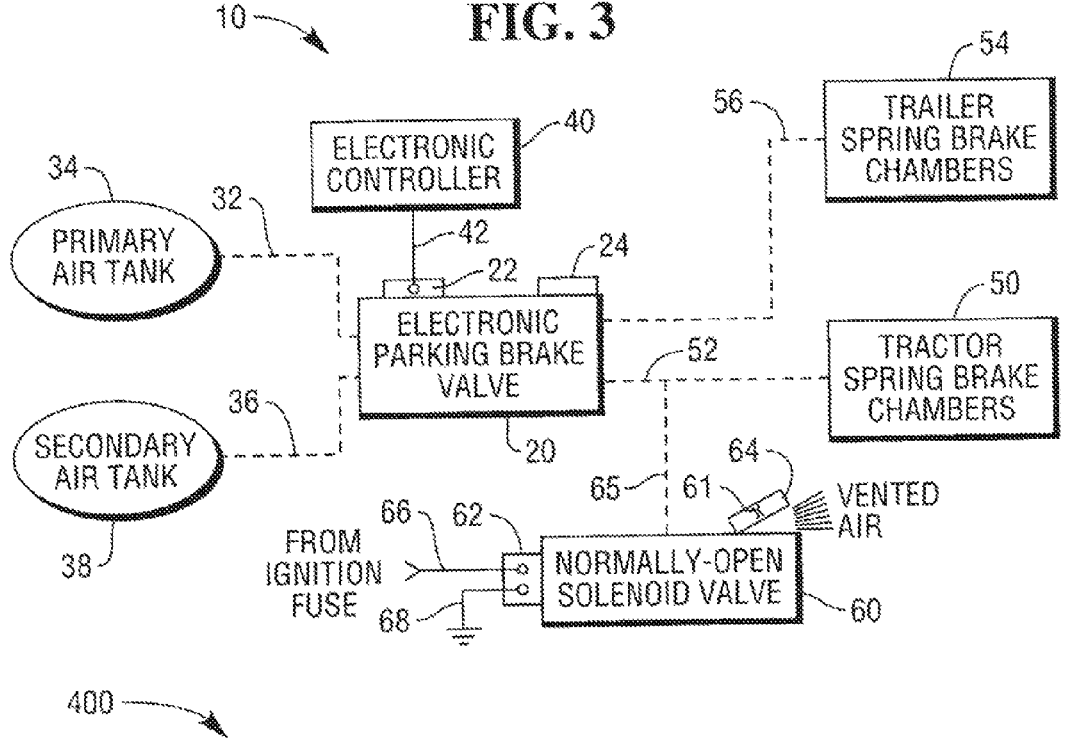

When electrical power from ignition fuse on line 66 to electrical connector 62 is lost, electrical coil of solenoid valve 60 is de-energized. When electrical coil is de-energized as shown in FIG. 3, valve portion of solenoid valve 60 is in opened position such that fluid communication between line 65 and vent port 64 is established (i.e., unblocked) to allow air pressure in line 65 to be vented through orifice 61 of vent port 64. Air pressure vented through orifice 61 of vent port 64 may be vented to atmosphere, for example. When this occurs, air pressure in delivery line 52 between EPB valve 20 and spring brake chambers 50 is bled down, resulting in parking brakes of the vehicle being applied.

More specifically, air pressure in delivery line 52 and spring brake chambers 50 is bled down through vent 64 of solenoid valve 60 until the trip pressure set in EPB valve 20 is reached. When the trip pressure is reached, EPB valve 20 operates to exhaust the remaining air pressure in delivery line 52, thereby exhausting the tractor spring brake chambers 50 to apply tractor parking brakes and exhausting the trailer spring brake chambers 54 to apply the trailer parking brakes. Thus, parking brakes of the vehicle are applied in response to a loss of electrical power on line 66.

Orifice 61 may be sized such that bleed down of air through orifice 61 makes an audible whistling sound to alert the vehicle driver that something is wrong in the event that the driver did not intentionally park the vehicle. Alternatively or in addition to, the audible whistling sound alerts the vehicle driver that electrical power has been lost and that parking brakes are being applied, without driver intervention, to park the vehicle.

Orifice 61 should make a sound loud enough to audibly alert the driver, but not too loud to be a nuisance to others not doing anything wrong (e.g., a mechanic). The audible sound should be unique and should be a long enough amount of time to warn the driver. Moreover, orifice 61 should bleed down air pressure slowly enough to reduce the severity of newly introduced failure modes and give the driver sufficient time to pull the vehicle over, but yet should bleed down air pressure quickly enough to park a stopped vehicle before it rolls away.

Figure 4:
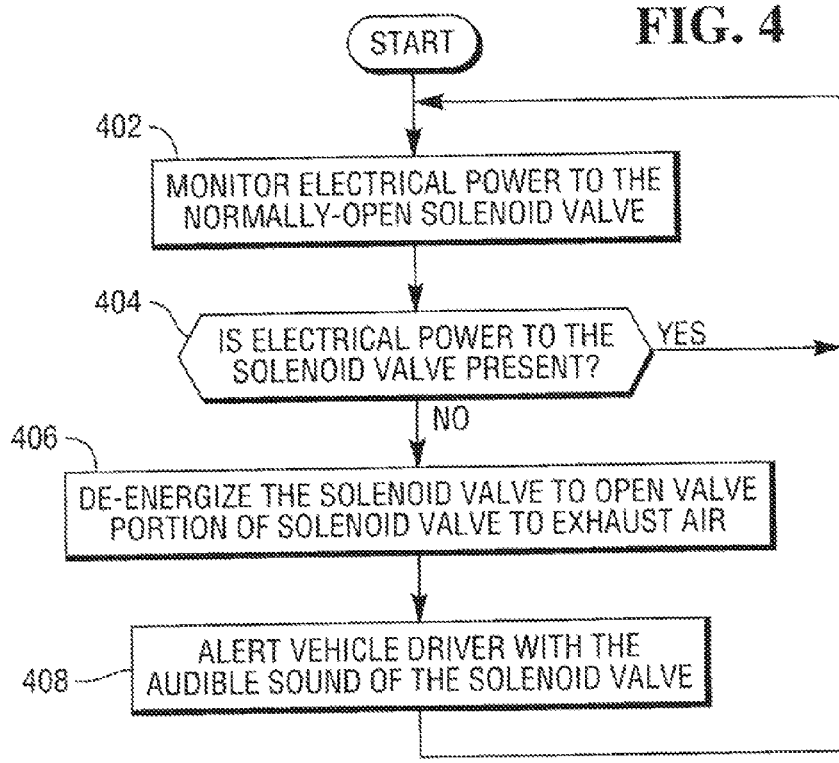
FIG. 4 is a flow diagram depicting operation of a parking apparatus in accordance with an embodiment.

Referring to FIG. 4, flow diagram 400 depicts operation of parking apparatus 10 of FIG. 1 to apply parking brakes, without driver intervention, to park the vehicle in accordance with an embodiment. In step 402, solenoid portion of solenoid valve 60 monitors electrical power on line 66. A determination is made in step 404 as to whether there is electrical power on line 66 to solenoid valve 60. If determination in step 404 is affirmative (i.e., there is electrical power on line 66), the process returns back to step 402 to continue monitoring electrical power on line 66.

However, if determination in step 404 is negative (i.e., there is no electrical power on line 66), the process proceeds to step 406. In step 406, electrical coil of solenoid portion of solenoid valve 60 is de-energized to open valve portion of solenoid valve 60. When this occurs, air in line 65 and therefore air in spring brake chambers 50 is exhausted through orifice 61 of vent port 64 to apply parking brakes of the vehicle. Air flow through orifice 61 produces an audible whistling sound to alert the vehicle driver that electrical power has been lost and the parking brakes are being applied in response thereto.

It should be apparent that solenoid valve 60 enables air pressure in line 52 to be exhausted to atmosphere to apply parking brakes of the vehicle to park the vehicle during an electrical power loss event. EPB valve 20 is enabled at a trip pressure that will protect the air reservoir pressure while exhausting the delivery pressure. Thus, by using solenoid valve 60 in accordance with an embodiment, the parking brakes of the vehicle can be applied without having to draw down substantially all of the air pressure in primary and secondary air tanks 34, 38.

It should also be apparent that the signal indicative of loss of electrical power may be obtained from the non-power side of an ignition fuse as shown in FIG. 1. The signal indicative of loss of electrical power may be obtained from other sources. For example, the signal may be obtained directly from the vehicle battery. In this case, a dead battery voltage may provide the signal on line 66 which is indicative of an electrical power loss event. As another example, a disconnected battery may provide the signal on line 66 indicative of an electrical power loss event. These are only example electrical power loss events, and other electrical power loss events are possible.

It should further be apparent that the above-described operation of the EPB system provides a function similar to a driver applying parking brakes. It should also be apparent that an automated parking mechanism is provided for an EPB system with only minimal addition of pneumatic components. Accordingly, an automated parking mechanism is provided at relatively low cost, and an existing EPB system can be easily retrofitted to provide the automated parking function described herein.

Although the above description describes line 65 from solenoid valve 60 teed into delivery line 52 which is associated with a vehicle tractor, it is conceivable that line 65 from solenoid valve 60 be teed into delivery line 56 which is associated with a trailer of the vehicle instead of the tractor of the vehicle. In this case, trailer parking brakes would be applied in the same manner as described hereinabove for application of tractor parking brakes. Moreover, it is conceivable that each of two or more solenoid valves may be teed into a corresponding delivery line which is connected in fluid communication with an associated air outlet port of EPB valve 20. For example, the air inlet port of a first solenoid valve may be teed into a delivery line which is associated with parking brakes of a vehicle tractor, and the air inlet port of a second solenoid valve may be teed into a delivery line which is associated with parking brakes of a vehicle trailer.

Also, although the above description describes EPB valve 20 having a valve body (as schematically shown in FIG. 1) and solenoid valve 60 having a valve body which is separate and spaced apart from the valve body of EPB valve 20, it is conceivable that the valve bodies be integrated as a single unit.

Further, although the above description describes normally-open solenoid valve 60 being operated in response to a signal indicative of loss of electrical power, it is conceivable that normally-open solenoid valve 60 could be operated by electrical controller 40 to exhaust air pressure in the spring brake system in response to an error condition in EPB valve 20, such as a mechanical malfunction of EPB valve 20.

Also, although the above description describes a heavy vehicle embodying an EPB valve, it is conceivable that the EPB valve could be replaced with a multi-function pneumatic valve, such as the MV-3® available from Bendix Commercial Vehicle Systems located in Elyria, Ohio. In this embodiment, the normally-open solenoid valve would be functional to exhaust air pressure in case of mechanical failure or in the case the driver forgot to set the parking brakes prior to removing ignition power.

Further, although the above description describes parking apparatus 10 being embodied in a tractor-trailer, it is conceivable that parking apparatus may be embodied in other types of heavy vehicles. For examples, parking apparatus may be embodied in a truck or bus.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking apparatus for a vehicle comprising:
an electronic parking brake (EPB) valve having a first air outlet port;
a first pneumatic delivery line interconnecting the first air outlet port of the EPB valve and a first spring brake system to allow air pressure from the EPB valve to be applied to the first spring brake system to maintain first parking brakes of the vehicle in released position; and
a first normally-open solenoid valve having a first air inlet port which is in communication with the first delivery line which interconnects the first air outlet port of the EPB valve and the first spring brake system, wherein the first solenoid valve is operable to vent air pressure from the first delivery line and thereby to apply the first spring brake system to park the vehicle in response to loss of electrical power to the first solenoid valve; wherein (i) the first solenoid valve has a first vent port which exhausts air from the first air inlet port of the first solenoid valve when the first solenoid valve is de-energized, (ii) the EPB valve has a vent port which exhausts air from the first air outlet port of the EPB valve based upon an electrical control signal applied to the EPB valve, and (iii) the vent port of the EPB valve and the first vent port of the first solenoid valve are separate from each other.

2. A parking apparatus according to claim 1, wherein (i) the first solenoid valve has a first valve body with a first vent port disposed on the first valve body of the first solenoid valve, (ii) the EPB valve has a valve body which is separate and spaced apart from the first valve body of the first solenoid valve, (iii) the EPB valve has a vent port disposed on the valve body of the EPB valve, and (iv) the vent port of the EPB valve and the first vent port of the first solenoid valve are not in fluid communication with each other.

3. A parking apparatus according to claim 1, wherein (i) the first solenoid valve has a first valve body with a first electrical connector disposed on the first valve body of the first solenoid valve, (ii) the EPB valve has a valve body which is separate and spaced apart from the first valve body of the first solenoid valve, (iii) the EPB valve has an electrical connector disposed on the valve body of the EPB valve, and (iv) the electrical connector of the EPB valve and the first electrical connector of the first solenoid valve are electrically isolated from each other.

4. A parking apparatus according to claim 1, wherein the first spring brake system comprises a number of tractor spring brake chambers in which air pressure from the EPB valve is applied to maintain tractor parking brakes of the vehicle in released position.

5. A parking apparatus according to claim 1, wherein (i) only the first solenoid valve operates to vent air pressure from the first delivery line until the pressure in the first delivery line reaches a trip pressure set in the EPB valve, and (ii) the EPB valve operates to vent air pressure in the first delivery line when the pressure in the first delivery line reaches the trip pressure.

6. A parking apparatus according to claim 1, further comprising:
- a second pneumatic delivery line interconnecting a second air outlet port of the EPB valve and a second spring brake system to allow air pressure from the EPB valve to be applied to the second spring brake system to maintain second parking brakes of the vehicle in released position; and
- a second normally-open trailer solenoid valve having a second air inlet port which is in communication with the second delivery line which interconnects the second air outlet port of the EPB valve and the second spring brake system, wherein the second solenoid valve is operable to vent air pressure from the second delivery line and thereby to apply the second spring brake system to park the vehicle in response to loss of electrical power to the second solenoid valve.

7. A parking apparatus according to claim 6, wherein (i) the first spring brake system comprises a number of tractor spring brake chambers in which air pressure from the EPB valve is applied to maintain tractor parking brakes of the vehicle in released position, and (ii) the second spring brake system comprises a number of trailer spring brake chambers in which air pressure from the EPB valve is applied to maintain trailer parking brakes of the vehicle in released position.

8. A parking apparatus according to claim 1, wherein the first solenoid valve is operable to vent air pressure from the first delivery line to atmosphere.

9. A parking apparatus according to claim 8, wherein (i) the first solenoid valve has an orifice which is connectable in fluid communication with the first air inlet port of the first solenoid valve, and (ii) the orifice is sized such that an audible whistling sound is produced to alert the vehicle driver when air pressure is vented from the first delivery line through the orifice of the first solenoid valve to atmosphere.

10. A parking brake valve for a vehicle comprising:
- a valve body having (i) a first port connected in fluid communication with air inlet ports of spring brake chambers to supply air pressure to the air inlet ports to allow air pressure to be applied to a number of spring brake chambers to maintain parking brakes of the vehicle in released position, and (ii) a second port connected in fluid communication with the air inlet ports of the spring brake chambers to vent air pressure from the air inlet ports to allow air pressure from the spring brake chambers to exhaust down and thereby to apply parking brakes of the vehicle to park the vehicle in response to an electrical signal indicative of loss of electrical power; wherein the first and second ports of the valve body are controllable independent of each other to vent air pressure from the spring brake chambers.

11. A parking brake valve according to claim 10, wherein (i) the valve body includes an electronic parking brake (EPB) valve portion which has the first port, and (ii) the valve body includes a normally-open solenoid valve portion which has the second port.

12. A parking brake valve according to claim 11, wherein (i) the EPB valve portion has an electrical connector, (ii) the solenoid valve portion has an electrical connector different from the electrical connector of the EPB valve portion, and (iii) the electrical connector of the EPB valve portion and the electrical connector of the solenoid valve portion are electrically isolated from each other.

13. A parking brake valve according to claim 12, wherein (i) the second port of the solenoid valve portion exhausts air from the second port of the solenoid valve portion to atmosphere when the solenoid valve portion is de-energized, and (ii) the first port of the EPB valve portion exhausts air from the first port of the EPB valve portion based upon an electrical control signal applied to the EPB valve portion.

14. A parking brake apparatus for a vehicle comprising:
- an electronic parking brake (EPB) valve having (i) a first air outlet port in fluid communication with a number of air inlet ports of a number of associated tractor spring brake chambers, and (ii) a second air outlet port in fluid communication with a number of air inlet ports of a number of associated trailer spring brake chambers; and
- electro-pneumatic means for, without vehicle driver intervention, venting air pressure from at least one of the first and second air outlet ports of the EPB valve to apply either tractor parking brakes associated with the tractor spring brake chambers or trailer parking brakes associated with the trailer spring brake chambers, or both.

15. A parking apparatus according to claim 14, wherein the electro-pneumatic means has an orifice through which air pressure from the at least one of the first and second air outlet ports of the EPB valve passes when air pressure is vented to atmosphere.

16. A parking apparatus according to claim 15, wherein the orifice is sized such that an audible whistling sound is produced when air pressure passing through the orifice is vented to atmosphere.

17. A parking apparatus according to claim 14, wherein (i) the EPB valve includes a valve body in which the first and second air outlet ports are disposed, and (ii) the electro-pneumatic means includes a valve body separate and spaced apart from the valve body of the EPB valve.

18. A parking apparatus according to claim 14, wherein the electro-pneumatic means comprises a normally-open solenoid valve having an electrical solenoid portion and a pneumatic valve portion.

\* \* \* \* \*